UNITED STATES PATENT OFFICE.

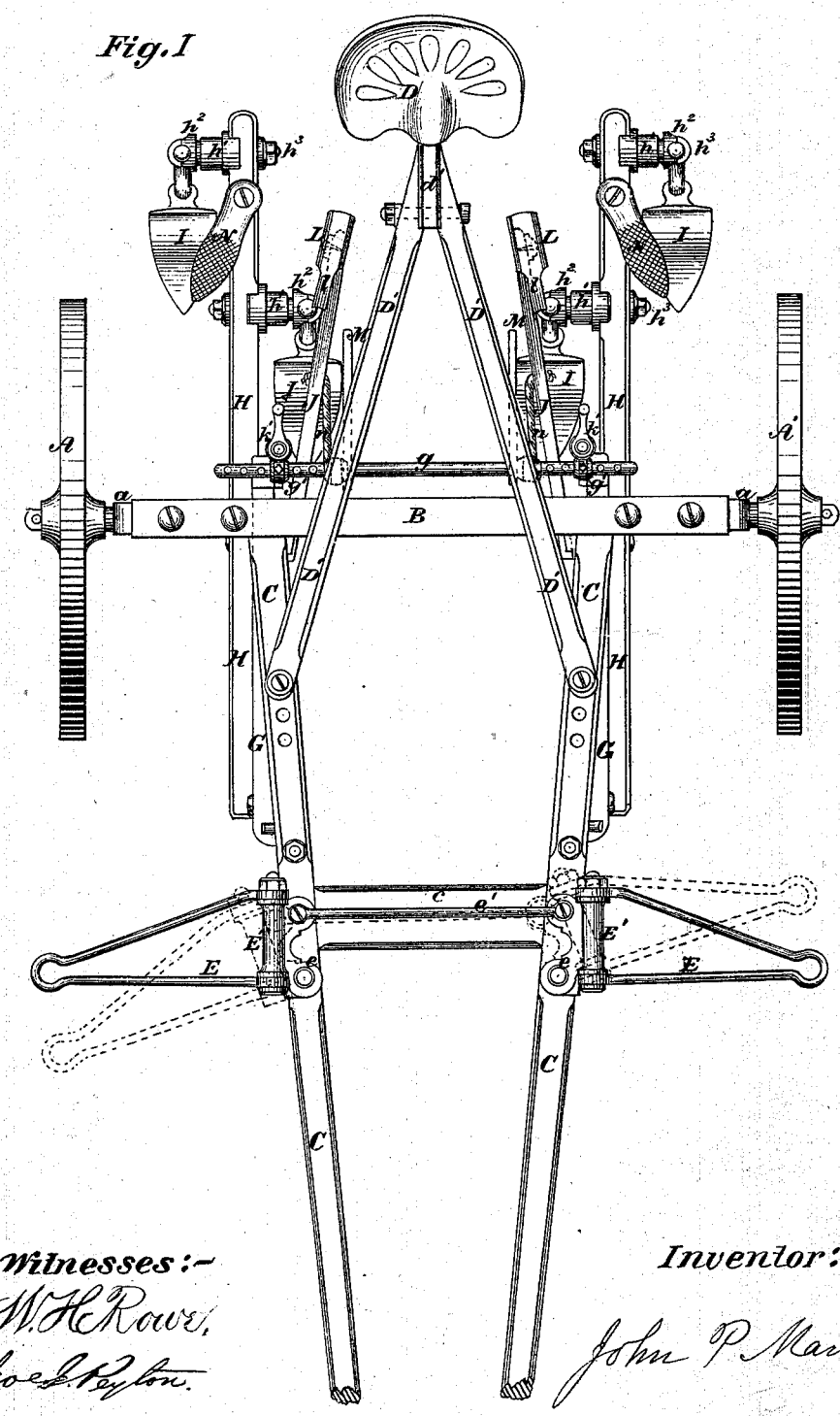

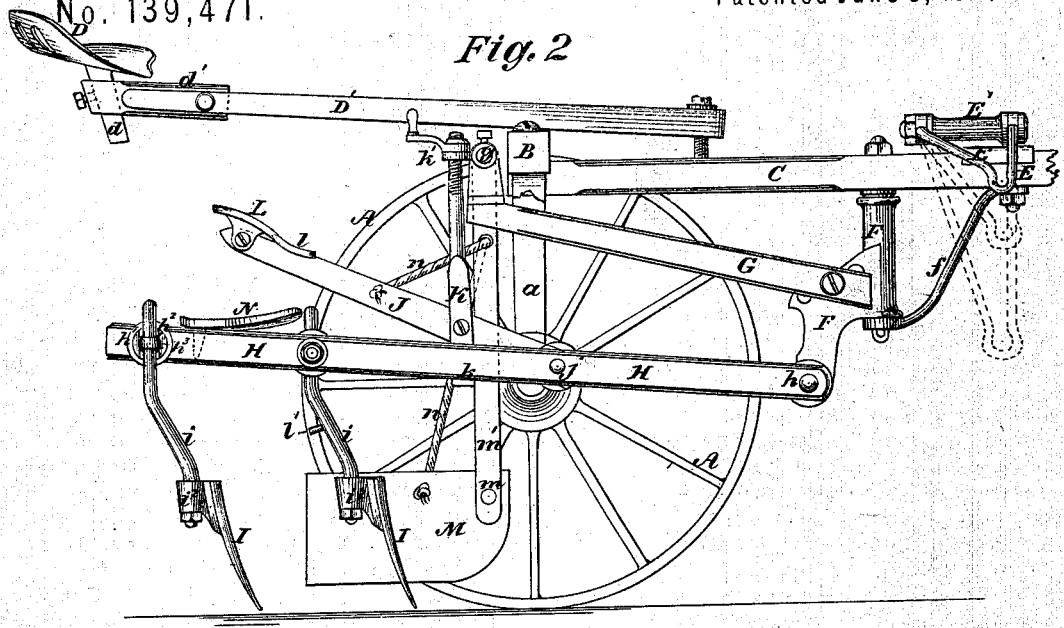
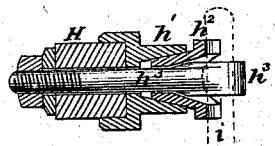
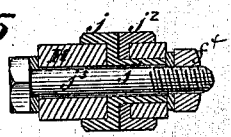
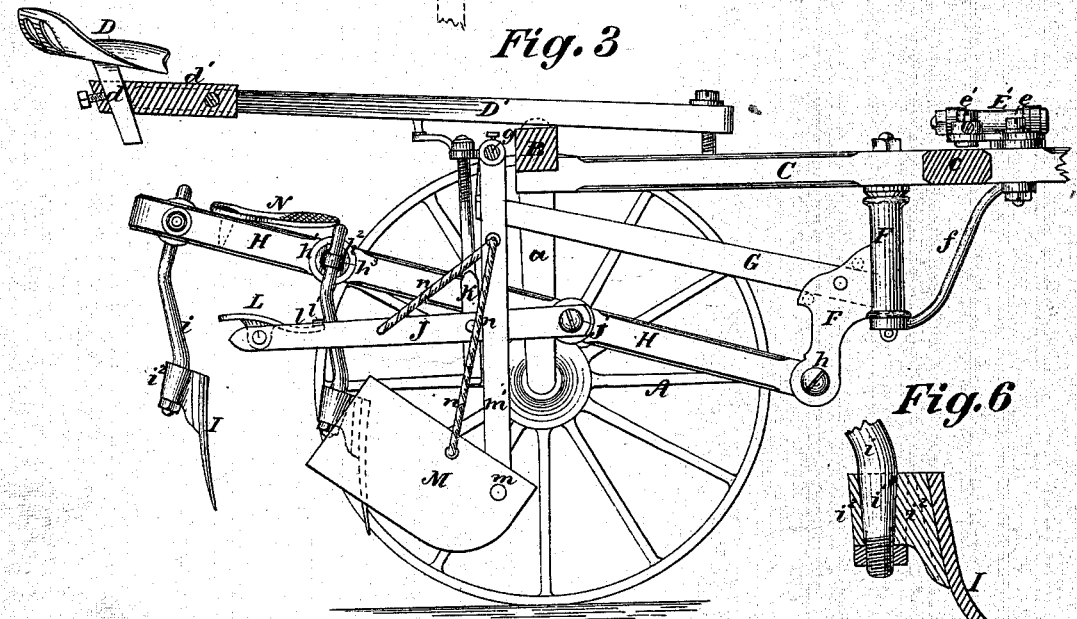
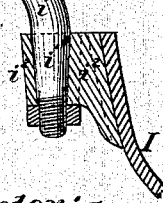

JOHN P. MANNY, OF ROCKFORD, ILLINOIS.

IMPROVEMENT IN CULTIVATORS.

Specification forming part of Letters Patent No. 139,471, dated June 3, 1873; application filed March 21, 1872.

*To all whom it may concern:*

Be it known that I, JOHN P. MANNY, of Rockford, Illinois, have invented certain new and useful Improvements in Cultivators, of which the following is a specification, reference being had to the accompanying drawings, in which all my improvements are shown as embodied in a single machine.

These improvements may be used, some without the others, and in machines differing in construction from that herein shown. The nature, purposes, and scope of the subject-matter herein claimed are fully set forth in this specification.

In the accompanying drawings of my improved machine—

Figure 1 is a plan; Fig. 2, a side elevation; Fig. 3, a longitudinal section; Fig. 4, a section, on an enlarged scale, through the friction-clutch for holding the shovel-standards on the drag-bar; Fig. 5, a similar view through one of the joints, hereinafter described, and Fig. 6, a similar section through the shovel-socket.

Two wheels, A A′, are mounted on crank-axles $a$, secured upon a frame-piece, B. The tongue C is formed of two converging timbers united to the beam B, and braced by a cross-bar, $c$. The driver's seat D is mounted on a standard, $d$, adjustable vertically in an overhanging frame composed of two converging timbers, D′, extending behind the axle. The socket in which the seat-standard slides is cast with a flanged ⊥-beam, $d'$, in the flanges of which the converging ends of the timbers are inserted and then clamped together by bolts passing through them. I thus secure a strong, cheap, simple, and effective device for sustaining and adjusting the driver's seat. The beams D′ can be adjusted backward or forward to accommodate the weight of the driver by means of a series of holes in the frame in which their forward ends are secured. I prefer to use wheels of small diameter and to have the frame rise above them, as shown, as the driver, when thus elevated, is protected from dirt being thrown up by the wheels and blown in his face, and can overlook the entire machine—which, likewise, rides more easily over a cross-plowed field than one with large wheels, as the small wheels rise over the ridges instead of bumping from ridge to ridge.

To adjust the line of draft in the most advantageous manner, I pivot a draft-frame or draw-bar, E, to each side of the tongue-frame in such manner as to allow the ends of the draw-bars to be set higher or lower, as shown by dotted lines in Fig. 2. To equalize the draft, I pivot these draw-bars in brackets E′, vibrating on vertical pivots $e$ on the frame, and connect them by a rod, $e^1$, which arrangement allows the draft-frames to oscillate horizontally around their pivots $e$, as shown by the dotted lines in Fig. 1.

In order freely to raise, lower, or vibrate the plows, I secure a stud underneath each tongue-piece and brace it securely by a rod, $f$. Brackets F are arranged to swing freely horizontally around these studs. Arms G, firmly secured to these brackets, project backward underneath the axle, and are connected by a rod, $g$, passing through eyes $g'$ on the arms and clamped by set-screws. The arms can be set nearer to or further from each other by this means, and, as the eyes are enlarged each way from their centers, the arms G can swing freely laterally without cramping while rigid vertically.

Drag-bars H swing freely vertically while braced against lateral strains on pivots $h$, on the lower ends of the brackets above mentioned. These drag-bars extend back of the axle and carry plows I, which are secured to them by bent standards $i$ in such manner that the plows can be adjusted still nearer to or further from each other than is permitted by the rod $g$, as above described. The plows and standards are secured together by means of tapering stocks $i^1$ fitting into sockets $i^2$ on the plows, and are clamped by screws and nuts, which permit the plows to be rigidly secured at any angular position with the line of draft. (See Fig. 6.) The standards are, in turn, secured to the drag-bars by friction-sockets, $h^1$, in which a conical hollow plug, $h^2$, takes; an eye-bolt, $h^3$, passes through the friction-socket, plug, and drag-bar, and is held by a nut and screw. (See Fig. 4.) The plow-standards can thus swing freely vertically as well as laterally. Radius-bars J pivoted to the drag-bars in a peculiar manner extend backward to a point where they can be reached by the feet of the driver. Rods K pivoted to these bars are bent at their lower ends to form hooks $k$ extending under the drag-bars. The upper ends of these rods pass through eyes $k'$ on the vibrating arms G, and are provided with devices by which they can be set up or down. In the drawings a screw and nut are shown for adjusting these rods, but in practice a cam and lever would probably be preferable, as giving a quicker motion. As the hooks $k$ support the drag-bars, this device enables me to set the plows to cut deeper or shallower furrows, and, as the adjustment for this purpose does not exceed a few inches, a cam-lever answers every purpose. The joint connecting the drag-bar and radius-bar is formed by a cap, $j$, which is provided with flanges that secure it to and prevent it from turning on the drag-bar, and a tubular flange, $j^1$, projects from this cap to form a bearing for the radius-bar. A thimble, $j^2$, has flanges that embrace the radius-bar in the same way that the flanges of the cap embrace the drag-bar, and not only serves to strengthen the radius-bar at the point where it is bored out to receive the journal, but also acts as the bearing-plate of the radius-bar both upon the flange and against the cap. A pivot-pin, $j^3$, passes through the drag-bar, cap, flange, and radius-bar, and serves to secure them together by the nut $f^4$, so that the drag-bar and radius-bar can freely vibrate vertically, but not laterally. Washers are placed under the heads of the bolt and under the nuts, and I prefer to have the nut or washer bear against the end of the tubular flange, and thus prevent the radius-bar and drag-bar from being clamped together too tightly. The joint between the drag-bar and bracket may be made in a similar manner. The bolt can screw directly into the drag-bar and not be secured by a bolt, when used in the former case, or it may screw directly into the bracket in the latter instance. The foot-treadle L, on the radius-bars, is provided with a pawl, $l$, which locks in a catch on one of the plow-standards when lifted, to hold them up when desired. This latter movement is independent of the former adjustment, and is useful in lifting the plows for transportation or to avoid obstructions. Shields M are pivoted at their front ends to bars $m'$, so as to swing freely vertically thereon on pivots $m$. The shields are also adjustable laterally by sliding the bars $m$ sidewise on the rod $g$, hereinbefore mentioned as forming part of the laterally-swinging frame G. Cords $n$ attached to the shield pass through eyes in the bars $m'$ and are attached to the radius-bars, by which means they are raised simultaneously with the drag-bars. The drag-bars have pedals N secured to them at their ends, within convenient reach of the driver's feet, so that he can bear upon them to keep the plows down to their work or sway the plow-frames from side to side, to follow the row or avoid obstructions.

It will be seen that by the combinations and arrangements above described I secure a complete and effective machine, that can be easily operated by the driver in his seat. The plows may be raised, lowered, and guided in their movements, and the other ordinary adjustments may be made by the driver with his feet, thus allowing him the free use of his hands to control and manage the team.

All of the mechanism, it will be observed, is suspended from the supplementary swing-frame G $g$ vibrating beneath the main frame, which construction gives a wide range of motion and renders the parts easy to manipulate.

I claim as new, and desire to secure by Letters Patent—

1. The combination, in a cultivator, of the bifurcated tongue-frame, the vertically-adjustable draw-bars E pivoted to the horizontally-swinging pivoted brackets E', and the hinged connecting-rod $e$, all these members being constructed and operating substantially as set forth.

2. The combination of the swing-frame G $g$, drag-bars H, suspension-rods K, and radius-bars J, substantially as set forth.

3. The combination of the swing-frame G $g$, shields M, suspension-rods K, radius-bars J, and drag-bars H, substantially as set forth.

4. The combination of the swing-frame G $g$, radius-bar J, drag-bar H, suspension-rod K, and locking-treadle L, substantially as set forth.

5. The combination of the drag-bar H, cap $j$, radius-bar J, thimble $j^2$, and bolt $j^3$, substantially as set forth.

6. The combination of the drag-bar H, the friction-socket $h^1$, the conical hollow plug $h^2$, the eye-bolt $h^3$, and the standard $i$, all these parts being constructed and operating as set forth.

7. The combination of the drag-bar H, the crank-shaped standard $i$, the socket $i^2$, and the shovel I, these parts being constructed as set forth.

In testimony whereof I have hereunto subscribed my name.

JOHN P. MANNY.

Witnesses:
 BALTIS DE LONG,
 EDWD. C. DAVIDSON.